United States Patent
Raith et al.

(10) Patent No.: US 6,477,362 B1
(45) Date of Patent: Nov. 5, 2002

(54) SYSTEMS AND METHODS FOR PROVIDING INFORMATION TO EMERGENCY SERVICE CENTERS

(75) Inventors: Alex K. Raith, Durham; Gregory E. Bottomley, Cary; James Ragsdale, Raleigh, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/844,883

(22) Filed: Apr. 22, 1997

(51) Int. Cl.$^7$ ................................................. H04Q 7/22
(52) U.S. Cl. ...................... 455/404; 455/456; 455/521
(58) Field of Search ............................... 455/404, 521, 455/527, 517, 524, 507, 422, 561, 456, 432, 433; 379/37, 45, 46; 342/457, 357, 354.01

(56) References Cited

U.S. PATENT DOCUMENTS

| | | | |
|---|---|---|---|
| 4,924,491 A | 5/1990 | Compton et al. | |
| 5,175,867 A | 12/1992 | Wejke et al. | |
| 5,327,144 A | 7/1994 | Stilp et al. | |
| 5,353,332 A | 10/1994 | Raith et al. | |
| 5,499,386 A | 3/1996 | Karlsson | |
| 5,519,760 A | * 5/1996 | Borkowski et al. | 455/404 |
| 5,563,931 A | * 10/1996 | Bishop et al. | 455/404 |
| 5,598,460 A | 1/1997 | Tendler | |
| 5,689,548 A | * 11/1997 | Maupin et al. | 455/404 |
| 5,742,904 A | * 4/1998 | Pinder et al. | 455/404 |
| 5,973,643 A | * 10/1999 | Hawkes et al. | 455/456 |
| 6,078,804 A | * 6/2000 | Alperovich et al. | 455/404 |

FOREIGN PATENT DOCUMENTS

WO    WO97/48247    12/1997

OTHER PUBLICATIONS

International Search Report re PCT/US98/06497 Date of mailing of search: Oct. 16, 1998.

* cited by examiner

Primary Examiner—Lester G. Kincaid
(74) Attorney, Agent, or Firm—Myers Bigel Sibley & Sajovec

(57) ABSTRACT

Emergency call handling may, in the near future, require terminal unit location information to be provided to emergency service centers. Exemplary embodiments of the present invention provide techniques which pass the mobile unit's phone number along to an appropriate emergency service centers in addition to location information. This information can be made available to an adjunct monitoring system by either changing the mobile station identity used to package (Layer 2) an access attempt or by commanding a mobile or base station to explicitly transmit the mobile unit's dialable number during an emergency access so that the adjunct system can read and forward this number.

11 Claims, 6 Drawing Sheets

| FIELD NAME | LENGTH (BITS) | VALUES |
|---|---|---|
| BT = BURST TYPE | 3 | 000 = BEGIN<br>001 = CONTINUE<br>010 = END<br>011 = BEGIN AND END<br>100 = SPACH ARQ STATUS<br>101...111 = RESERVED |
| RSVD = RESERVED | 1/2 | SET TO ZERO. |
| CI = CHANGE INDICATOR | 1 | STARTS AT 0, TOGGLES FOR EVERY NEW TRANSMITTED FRAME. STAYS THE SAME FOR EVERY REPEATED FRAME. |
| EHI = EXTENSION HEADER INDICATOR | 1 | 0 = EXTENSION HEADER NOT PRESENT<br>1 = EXTENSION HEADER IS PRESENT |
| IDT = IDENTITY TYPE | 2 | 00 = 20-BIT TMSI<br>01 = 24-BIT TMSI<br>10 = 34-BIT MIN<br>11 = 50-BIT IMSI |
| MSID = MOBILE STATION IDENTITY | 20/24/34/50 | 20-BIT TMSI<br>24-BIT TMSI<br>34-BIT IS-136.2 MIN<br>50-BIT IMSI |
| NL3M = NUMBER OF LAYER 3 MESSAGES | 3 | 000 = 1 LAYER 3 MESSAGE<br>001 = 2 " " "<br>010 = 3 " " "<br>011 = 4 " " "<br>... ... ... ... ...<br>111 = 8 LAYER 3 MESSAGES |
| L3LI = LAYER 3 LENGTH INDICATOR (1 TO 8 INSTANCES MAY BE PRESENT) | 8 | VARIABLE LENGTH LAYER 3 MESSAGES SUPPORTED FROM 0 UP TO A MAXIMUM OF 255 OCTETS. |
| L3DATA = LAYER 3 DATA | VARIABLE | CONTAINS A PORTION (SOME OR ALL) OF THE LAYER 3 MESSAGE HAVING AN OVERALL LENGTH AS INDICATED BY L3LI. THE PORTION OF THIS FIELD NOT USED TO CARRY LAYER 3 INFORMATION IS FILLED WITH ZEROS. |
| PEA = PARTIAL ECHO ASSIGNED | 7 | THE 7-BIT PARTIAL ECHO VALUE USED BY A MOBILE STATION DURING AN ARQ MODE TRANSACTION (SEE SECTION 5.4.2). |
| MEA = MESSAGE ENCRYPTION ALGORITHM | 2 | 00 = RESERVED<br>01 = "<br>10 = "<br>11 = RESERVED FOR SOC/BSMC SPECIFIC SIGNALING. |

*Fig. 3*

SYSTEMS AND METHODS FOR PROVIDING INFORMATION TO EMERGENCY SERVICE CENTERS

BACKGROUND

Applicants' invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to independently determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit location information. In a first category, the mobile unit could estimate its own position and send a message with its coordinates when placing an emergency call. This could be accomplished by, for example, providing the mobile unit with a Global Positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signalling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144. These solutions also have their drawbacks including the need to modify the many existing base stations, e.g., to provide array antennas to support angle-of-arrival techniques or to synchronize base station transmissions to support TDOA techniques.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 1 wherein the adjunct scanning units are not co-located with the base stations of radiocommunication system. Therein, a base station 1 supports radiocommunication within cell 2 and, in particular with mobile unit 3. An adjunct system, partially shown by way of scanning units 4, 5 and 6, monitors accesses to the system by mobile unit 3. When mobile unit 3 makes an emergency access, adjunct units 4, 5 and 6 can detect this emergency access by, for example, the presence of a set emergency flag in an origination message or based upon the dialed number. The adjunct units can then use the mobile unit's transmissions on either a control channel or a traffic channel to provide information to a location processing center 7. The location processing center then uses the information provided by the various adjunct units to, for example, triangulate the position of mobile unit 3 and report this position to an emergency service center 8. More details regarding exemplary usages of adjunct systems can be found in U.S. Patent No. 5,327,144 to Stilp et al., entitled "Cellular Telephone Location System", the disclosure of which is incorporated here by reference.

However, one problem associated with the use of adjunct systems involves the desirability of the emergency center mapping the location of a mobile unit provided by the adjunct system with the emergency call received from the radiocommunication system. Consider this issue in the context of systems operating in accordance with IS-136, which has three types of mobile identifiers. The mobile identification number (MIN) is the same identifier as used in the older analog AMPS system and is a binary representation of the mobile station's phone number, which is also referred to as the directory Number (DN). Given the need for global mobility, however, the differences between these and other existing techniques for identifying mobile units need to be reconciled.

This, among other reasons, lead to the development of the International Mobile Station Identifier (IMSI), which is a decimal identifier number having a maximum of 15 decimal digits. Although IMSI is not a dialable number, it does solve the problem of international roaming and is transmitted over the air interface as a mobile station identification (MSID) encoded to 50 bits. Due to the length of IMSI, however, a single page message transmitted by the radiocommunication system can carry three pages to mobiles using MIN but only one page using IMSI. Thus, using IMSI reduces the paging capacity (pages per time unit) per control channel.

In order to overcome this problem and further increase the paging capacity compared with the MIN, but still provide the capacity for international roaming, the Temporary Mobile Station Identifier (TMSI) was introduced. In IS-136 the length of TMSI is 20 or 24 bits which results in four or five pages per paging message, respectively. The TMSI is assigned to a mobile station in a TMSI assignment procedure after which the mobile station can be reached by the cellular system using the TMSI. When the mobile unit travels to a "new" system, the mobile unit is reassigned a new TMSI controlled by the "new" system. In addition to being used to contact a mobile unit, the same identity type is typically used when the mobile station contacts (i.e., makes an access attempt with) the cellular system. Thus, for mobile units having an assigned (also referred to as "active") TMSI, this may conventionally be the identifier which is used in access messaging between the mobile unit and the system.

The radiocommunication system has the capability to translate these identifiers into the mobile unit's dialable number and provide both the emergency call and the dialable number to the emergency service center. However, usage of IMSI and TMSI poses a problem for an adjunct positioning system. Specifically, the "phone number" of the mobile unit 3 is typically not present in the signalling which is monitored by the adjunct scanning units 4, 5 and 6 and the adjunct system cannot keep track of the various TMSIs assigned by the radiocommunication system. Thus, although the adjunct system can estimate the position of the mobile unit, e.g., as described in U.S. Pat. No. 5,327,144 to Stilp et al., the adjunct system can not forward the "phone number" to the application, e.g., emergency service center 8. Thus, emergency service center 8 will have difficulty mapping the position information received from the adjunct system with the emergency call received from the radiocommunication system. Accordingly, it would be desirable to provide techniques for the emergency service center to receive information regarding the phone number associated with a mobile unit making an emergency access to a radiocommunication system.

SUMMARY

According to exemplary embodiments of the present invention, these drawbacks and limitations of handling emergency calls are overcome. For example, upon recognizing that an emergency call is to be made, a mobile unit can ignore typical access rules and use its MIN as part of its system access messaging. In this way, the adjunct system can acquire and forward this information to the appropriate emergency service center. Alternatively, or in addition thereto, the system can use the MIN to address messaging in the downlink, which could also be monitored by the adjunct system.

According to another exemplary embodiment, the mobile unit may, upon recognition of an emergency call, use its predefined mobile station identity type for addressing during system access, but include its dialable number as part of the access payload. Similarly, the system (i.e., the base station) can transmit that mobile unit's dialable number as an address of a response to an emergency access attempt. In either case, the adjunct system can read this information and forward same to the emergency service center.

BRIEF DESCRIPTION OF THE DRAWINGS

The features and advantages of Applicants' invention will be understood by reading this description in conjunction with the drawings, in which:

FIG. 3 is a portion of a chart illustrating RACH fields according to IS-136;

DETAILED DESCRIPTION

The following description is scripted in terms of a cellular radiotelephone system, but it will be understood that Applicants' invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, it will be understood by those skilled in the art that the present invention may be applied to systems using any access methodology, e.g,. Frequency Division Multiple Access (FDMA), Code Division Multiple Access (CDMA) and hybrids of FDMA, TDMA and/or CDMA.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS136, adds specifications for digital control channels (DCCs), which standard is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six channels (e.g., one to six radio connections), which may be a mixture of DTCs and DCCs used to convey information between a base station and a mobile station.

Figure 1:
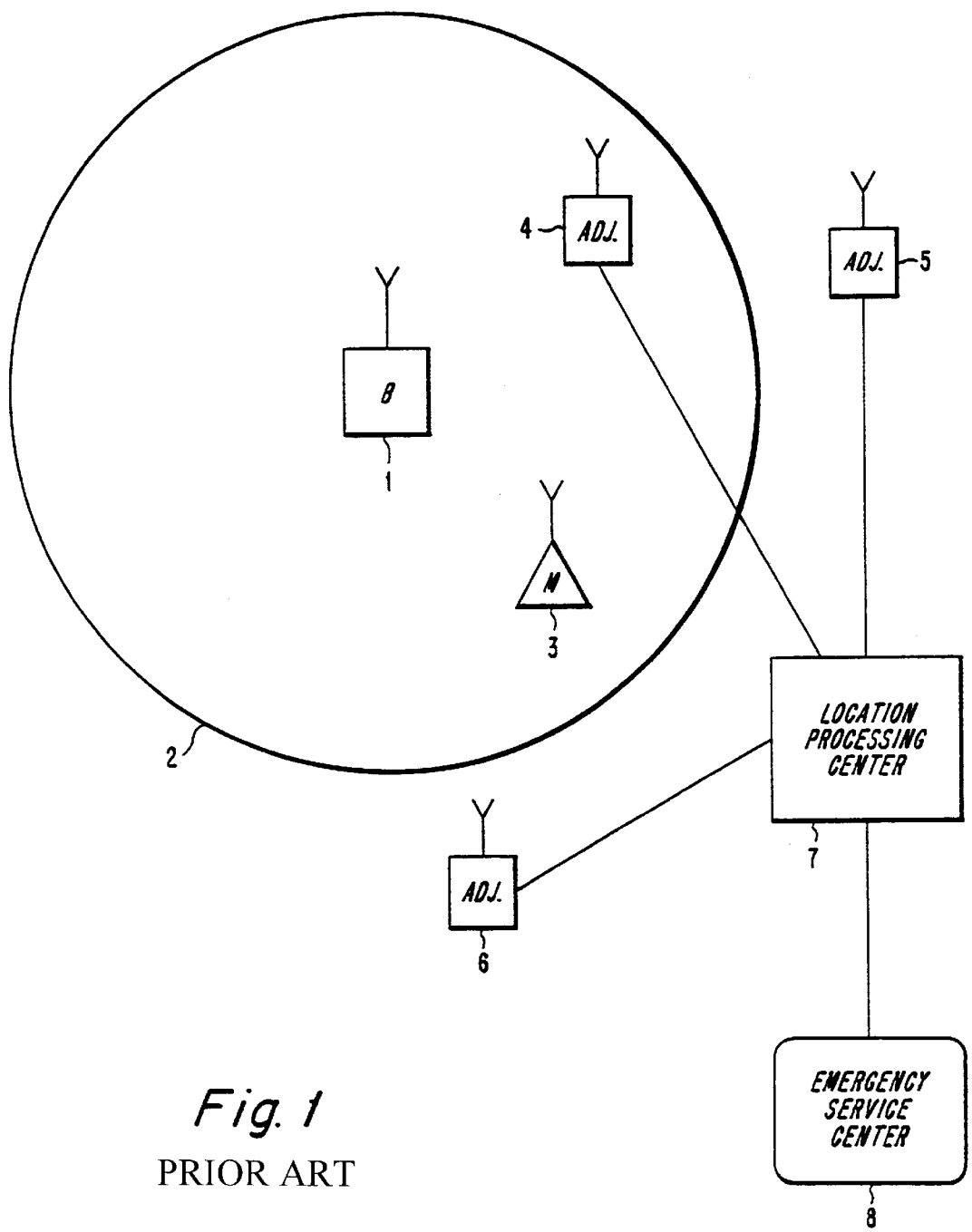
FIG. 1 is a diagram of an exemplary cellular radio telephone system having an adjunct monitoring system for providing mobile unit location information to an emergency service center in which the present invention may be applied.
Figure 2:
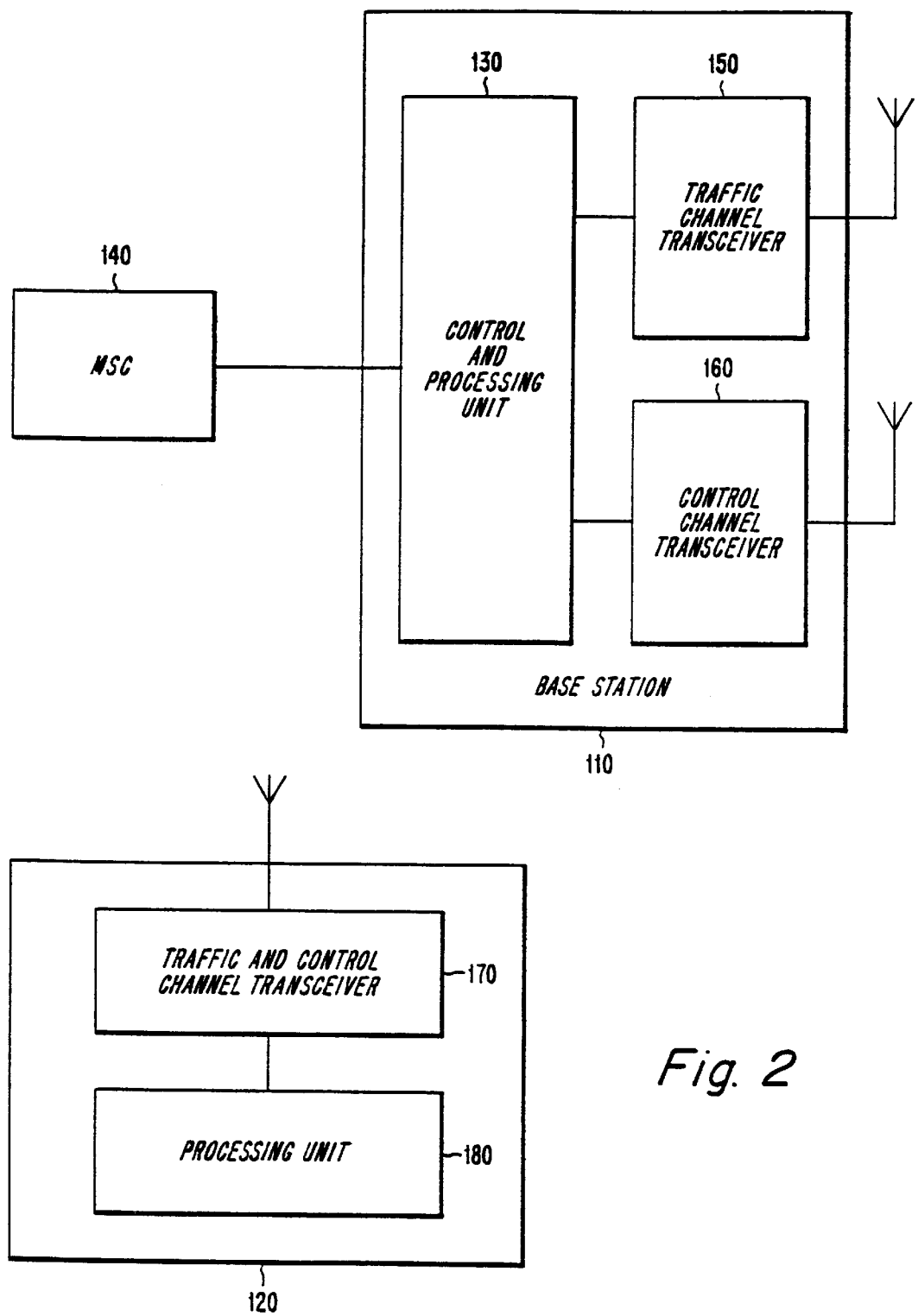
FIG. 2 illustrates an exemplary base station and mobile unit which may operate in accordance with the present invention.

FIG. 2 represents a block diagram of an exemplary cellular mobile radiotelephone system, including an exemplary base station 110 and mobile unit 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

Once the mobile unit has found a control channel which satisfies a minimum set of rules, e.g., the mobiles must be able to receive the channel above a minimum received signal strength, the mobile may further evaluate this control channel with regard to certain system preferences stored in the mobile unit. For example, if the cell is barred (as described in IS-136), or the cellular operator is not the preferred operator (using the System Operator Code in IS-136), the mobile unit may then try to find another control channel.

If the data broadcast by the cellular system on the control channel (this part of the DCC is often referred as to the Broadcast Control Channel or BCCH) satisfies the preferences stored in the mobile unit, the mobile unit will listen or lock to this control channel to listen for paging messages and/or transmit call origination messages. At the same time, however, the mobile unit prepares for potential cell reselection since the mobile may be traveling and leaving the coverage area of the first selected control channel. Many known techniques exist for informing a mobile unit where (e.g., using one or more of frequency, time, and code) the neighboring control channels can be found in order for mobile units to test and compare these candidates with the current control channel to find the best control channel to serve the mobile unit given its current position. See, for example, U.S. Pat. No. 5,353,332 to Raith and Muller, entitled "Method and Apparatus for Communication Control in a Radiotelephone System" or U.S. Pat. No. 5,499,386, entitled "Best Server Selection in Layered Cellular Radio System" to Karlsson, the disclosures of which are incorporated here by reference.

As discussed above, it may be important for the emergency service center 8 to receive the phone number of the mobile unit which placed an emergency call. For example, the original call may be dropped, so that having access to the phone number makes allows the emergency service center to call this particular mobile unit to re-establish the communication link. Additionally, the phone number may be of importance in documenting the emergency request. Further, if the emergency service center does not receive the phone number from the adjunct system, it may be difficult to map the position information received from the adjunct system with the emergency call received from the cellular system.

When a mobile unit makes an access attempt to establish a connection with a radiocommunication system, it does so by sending messages on an uplink access channel or control channel. In systems specified by IS-136, the uplink control channel is referred to as the Random Access CHannel (RACH). A portion of the field definitions for the Layer 2 RACH protocol is reproduced as FIG. 3. For this particular discussion, only the identity type (IDT) and mobile station identity (MSID) fields are of interest and described here. In these fields, it can be seen that any one of the 20-bit TMSI, the 24-bit TMSI, the 34-bit MIN or the 50-bit IMSI can be sent by the mobile unit when making a system access on the RACH.

In fact, the mobile unit will transmit its TMSI value in the MSID field if it has a valid (as defined in IS-136 Section 8.1.2.2) TMSI. If the mobile unit only has an IMSI, then it will use the IMSI as its MSID. Similarly, if the mobile unit only has a MIN, then it will use the MIN as its MSID. If the mobile unit has both an IMSI and a MIN, then the selection of one of these identifiers is made in accordance with rules which are also defined in IS-136. Significantly, following the rules defined by the standard leads to only a relatively few mobile units supplying their MIN as part of an access burst. Thus, the adjunct stations 4, 5 and 6 will receive the TMSI or IMSI in many uplink bursts.

In these cases, the adjunct stations can, according to one exemplary embodiment of the present invention, forward this TMSI information to the emergency service center 8, along with the location information generated by location processing center 7 and, optionally, an indication that a permanent mobile station identification (PMSID) is not available. Although not usable by the emergency service center to call the mobile unit back, the TMSI can be stored by the emergency service center 8 for later usage, e.g., by the authorities in conjunction with information available in the cellular radiocommunication system to later identify the mobile unit by tracing the DN from the TMSI and the time of the call. If the IMSI is used, the time is not needed since the IMSI is only changed when the subscription record in the home system is changed which is typically is not a frequent event.

Figure 4:
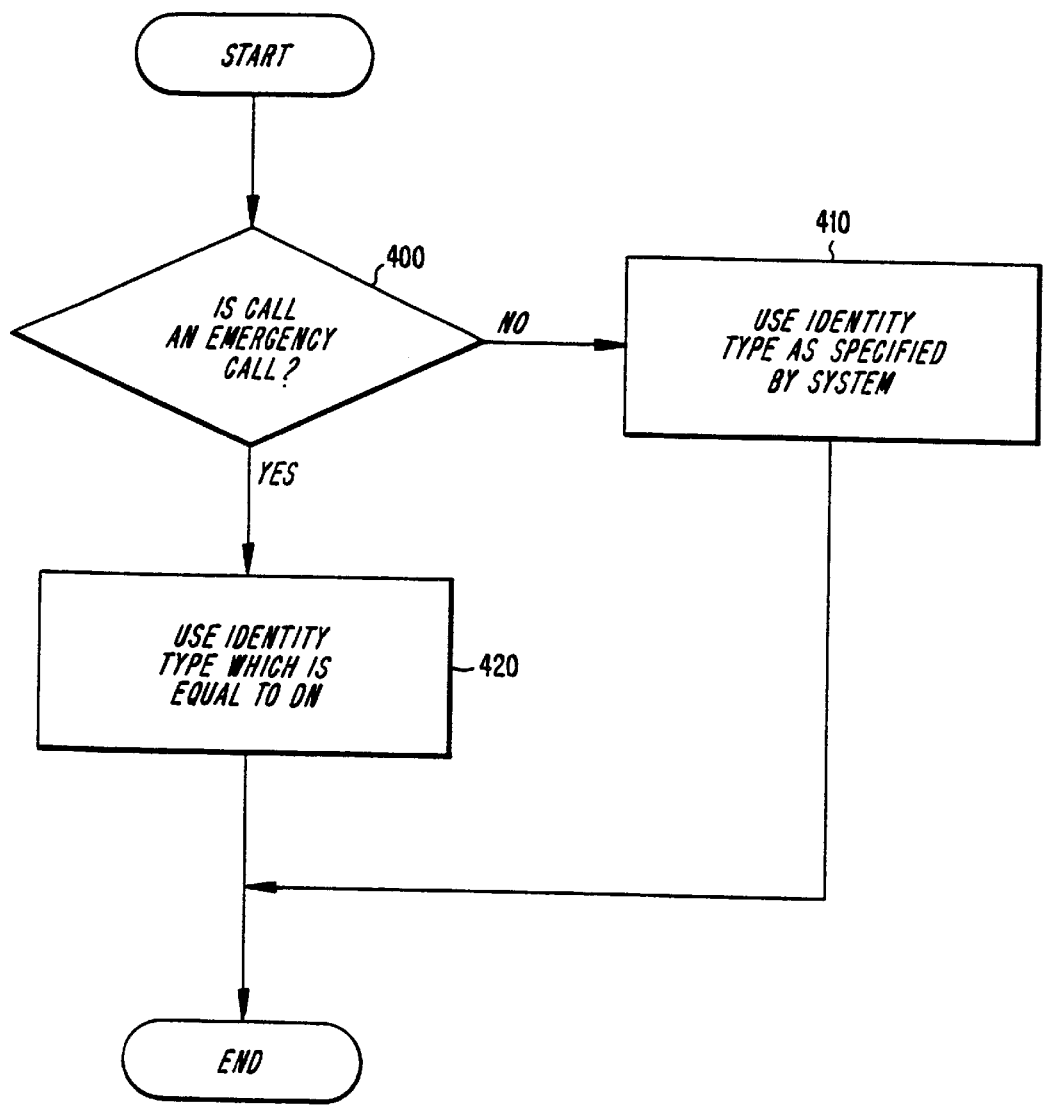
FIG. 4 is a flow chart illustrating a first exemplary embodiment of the present invention.

Alternatively, it may be desirable to ensure that the emergency service center 8 actually receive the mobile unit 3's phone number. According to another exemplary embodiment of the present invention, depicted by way of the flow chart of FIG. 4, the mobile unit will use its MIN instead of TMSI or IMSI when it detects that an emergency call is being placed. Therein, at step 400, the mobile unit evaluates a call being placed to determine if it is an emergency call. This can be accomplished, for example, as described in U.S. patent application Ser. No. 08/843,752, entitled "Systems and Methods for Identifying Emergency Calls in Radiocommunication Systems, filed on Apr. 22, 1997, the disclosure of which is incorporated here by reference.

If the call is not an emergency call, then the flow proceeds to block 410, wherein the "normal" identity type is used by the mobile unit to perform the access attempt. For example, assuming that an IS-136 conformant mobile unit has a valid TMSI, then that value would be used in the RACH messages transmitted by the mobile unit. If the call is an emergency call, then the flow instead proceeds to block 420, where the mobile station selects an identity type (if any) which is equivalent to its dialed number. Using the previous example, the IS-136 mobile unit would use its MIN in transmitted RACH messages instead of its valid TMSI or IMSI. In this way, the adjunct scanning stations will receive the mobile unit's MIN and can forward this information to emergency service center 8, along with the location information generated by the location processing center 7.

According to another exemplary embodiment of the present invention, the mobile unit uses an identity according to the system specified rules, e.g., using MIN, IMSI or TMSI in the above-described fields in Layer2, but also includes the mobile unit's dialable number (DN) as part of the access, e.g., as part of a Layer3 message. The mobile unit can store the DN, which may be input into the unit by the user. Alternatively, for example in units operating in accordance with IS-136, the DN can be downloaded to the phone as part of the over-the-air interface activation service (OATS).

Moreover, when the mobile unit is purchased it may not contain an identity (e.g., MIN, IMSI). For IS-136, the mobile unit makes an access using the Activating MIN (AMIN) which is constructed from the Electronic Serial Number (ESN) for this special access. Thus, if the user needs to make an emergency call at this point in time, the mobile unit would use the AMIN as the PMSID in the RACH field and make the emergency access as described above.

Otherwise, if the user makes a "normal" initial access to the system using the AMIN, the system may now download (among other things) this mobile unit's identity (e.g., MIN and/or IMSI). Note that there may be multiple instances of identities each linked to a separate subscription. For example, different family members may use the same mobile unit, wherein each user activates a different subscription. Alternatively, a single user may have multiple subscriptions because he or she may want to activate on two systems to avoid roaming charges. In any event, for each logical identity (which for IS-136 can the MIN and/or IMSI), the download message may contain the associated DN. Thus, the user can have the DN displayed for the current subscription and this DN can also be transmitted to the system during emergency calls.

According to another exemplary embodiment, the adjunct system can acquire the DN by listening to the downlink control channel. For example, the system may respond to the mobile unit using its MIN and the adjunct system can read this information on the DCC. However, this assumes that the mobile unit is listening to both its MIN and the identifier type used when making the access, e.g. TMSI, as an address. If the particular system protocol does not mandate that the mobile unit listen to both identity types, the system can use the same identity type as used by the mobile unit when sending a response to the mobile and include the DN as part of the payload in the message.

Figure 5:
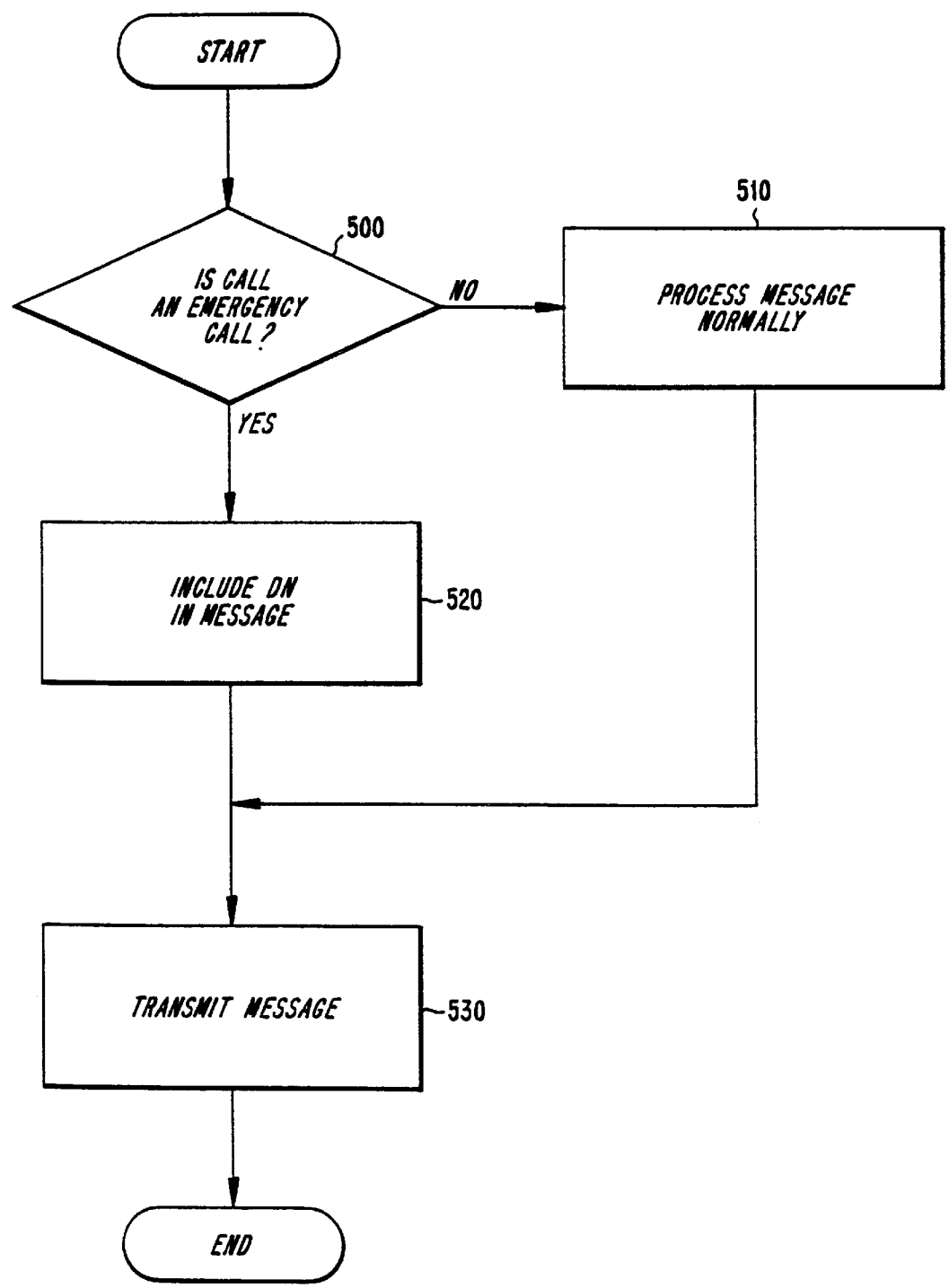
FIG. 5 is a flow chart illustrating a second exemplary embodiment of the present invention.

These exemplary embodiments involving the explicit transmission of the DN in Layer 3 are summarized by way of the flow chart of FIG. 5, which technique is generic to mobile unit and base station operation (i.e., uplink or downlink). Therein, at block 500, the call is identified as emergency or non-emergency. If the call is a non-emergency call then the message, e.g., a RACH or ARCH message, is processed in accordance with the appropriate standard and system rules at block 510. Otherwise, if the call is an emergency call, then the dialable number is included in a message (step 520) which is transmitted at block 530 using the standard or system specified mobile station identifier for Layer 2 addressing.

Figure 6:
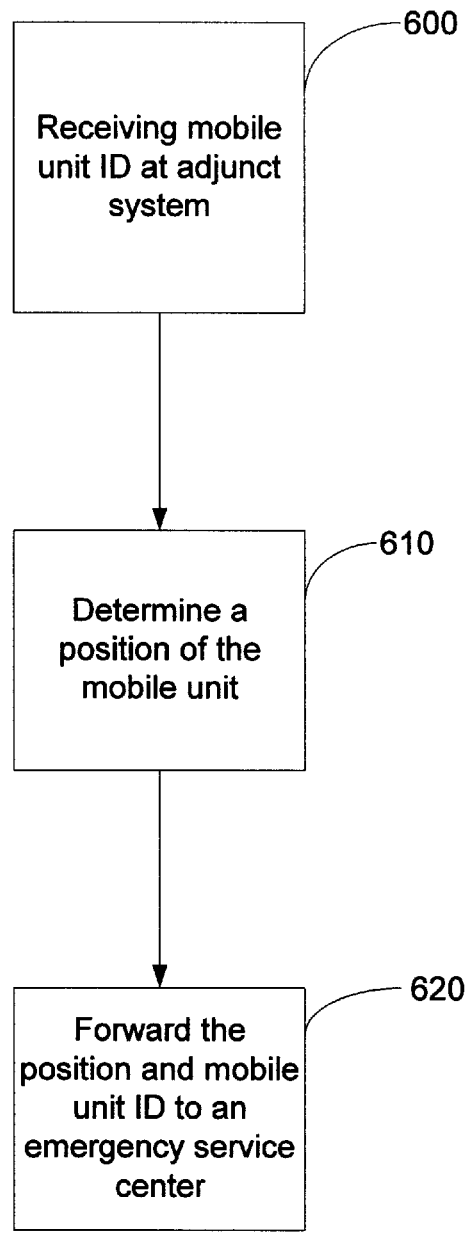
FIG. 6 is a flow chart illustrating a third exemplary embodiment of the present invention.

In accordance with another exemplary embodiment, as summarized by way of the flow chart of FIG. 6, a method of forwarding a mobile unit position and a mobile unit identity for a mobile unit making an emergency call in a radio communication system is provided with reference to an adjunct system. In step 600, the adjunct system receives the mobile unit identity in signaling data associated with an emergency call from the mobile unit. The position of the mobile unit is then determined in step 610. Subsequently in step 620, the position and mobile unit identity are forwarded from the adjunct system to an emergency service center. In accordance with yet another embodiment of the invention, the forwarding of the position and mobile unit identity in step 620 is accomplished without routing the information through the radio communication system.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for handling an emergency call in a radio-communication system, comprising the steps of:

identifying, in a mobile unit, a call as one of an emergency call and a non-emergency call;

selecting a first mobile unit identifier if said call is an emergency call;

selecting a second mobile unit identifier if said call is a non-emergency call; and transmitting a message from said mobile unit to said system using said selected mobile unit identifier.

2. The method of claim 1, wherein said first mobile unit identifier is a mobile identification number (MIN).

3. The method of claim 1, wherein said first mobile unit identifier is an activating mobile identification number (AMIN).

4. The method of claim 1, wherein said second mobile unit identifier is a temporary mobile station identifier (TMSI).

5. The method of claim 1, wherein said first mobile unit identifier includes a dialable number associated with a mobile unit.

6. The method of claim 1 further comprising the steps of:

receiving, at an adjunct system, said selected mobile unit identifier in signaling data associated with an emergency call from said mobile unit;

determining a position of said mobile unit; and forwarding said position and said selected mobile unit identifier from said adjunct system to an emergency service center.

7. The method of claim 6, further comprising the step of forwarding to said emergency service center, without routing through the radio communication system, said selected mobile unit identifier.

8. A method for handling an emergency call in a radio-communication system, comprising the steps of:

identifying, in a mobile unit, a call as one of an emergency call and a non-emergency call;

retrieving a stored dialable number associated with said mobile unit if said call is an emergency call;

retrieving a temporary mobile station identifier (TMSI) if said call is a non-emergency call; and selectively transmitting a message to said system including said dialable number or said TMSI.

9. The method of claim 8, further comprising the steps of:

inputting, by a user of said mobile unit, said dialable number to said mobile unit; and storing said dialable number.

10. The method of claim 8, further comprising the steps of:

transmitting, over an air interface, said dialable number to said mobile unit; and storing said dialable number.

11. A remote station comprising:

means for identifying a call as one of an emergency call and a non-emergency call;

means for selecting a first mobile unit identifier if said call is an emergency call; and means for selecting a second mobile unit identifier if said call is a non-emergency call; and means for transmitting a message from said mobile unit using said selected mobile unit identifier.

* * * * *